United States Patent
Wang

(10) Patent No.: US 10,677,952 B2
(45) Date of Patent: Jun. 9, 2020

(54) SELF-BALANCE NOISE REDUCTION METAL DETECTION DOUBLE-COIL

(71) Applicant: Shenzhen Aoyadi Electronic Equipment Co., Ltd., Shenzhen (CN)

(72) Inventor: Lan Wang, Shenzhen (CN)

(*) Notice: Subject to any disclaimer, the term of this patent is extended or adjusted under 35 U.S.C. 154(b) by 48 days.

(21) Appl. No.: 15/753,538

(22) PCT Filed: Dec. 7, 2016

(86) PCT No.: PCT/CN2016/108766
§ 371 (c)(1),
(2) Date: Feb. 19, 2018

(87) PCT Pub. No.: WO2017/114109
PCT Pub. Date: Jul. 6, 2017

(65) Prior Publication Data
US 2018/0246244 A1  Aug. 30, 2018

(30) Foreign Application Priority Data

Dec. 28, 2015  (CN) .......................... 2015 1 0989198
Dec. 28, 2015  (CN) ..................... 2015 2 1097066 U

(51) Int. Cl.
*G01V 3/10* (2006.01)

(52) U.S. Cl.
CPC .................. *G01V 3/107* (2013.01)

(58) Field of Classification Search
CPC .................. G01V 3/107; H03K 2017/9527
USPC .................. 324/207.16–207.19, 326–329
See application file for complete search history.

(56) References Cited

U.S. PATENT DOCUMENTS

| | | | | |
|---|---|---|---|---|
| 2,338,793 A | * | 1/1944 | Zuschlag | G01V 3/107 324/243 |
| 3,757,501 A | * | 9/1973 | Bennett, Jr. | G01V 3/107 460/2 |
| 3,758,849 A | * | 9/1973 | Susman | G01V 3/107 324/225 |
| 3,823,365 A | * | 7/1974 | Anderson | G01V 3/15 324/328 |
| 4,309,697 A | * | 1/1982 | Weaver | G08B 13/2408 340/572.2 |
| 4,623,877 A | * | 11/1986 | Buckens | G08B 13/2408 340/572.2 |

(Continued)

*Primary Examiner* — Patrick Assouad
*Assistant Examiner* — Demetrius R Pretlow
(74) *Attorney, Agent, or Firm* — Novoclaims Patent Services LLC; Mei Lin Wong

(57) ABSTRACT

A self-balance noise reduction metal detection double-coil comprises a main magnetic field transmitting coil and a plurality of induction coils. Each induction coil is composed of two inductors and induction unicoils in series connection, wherein the induction unicoils have similar Q values and are arranged in parallel. Every two adjacent induction coils are arranged in an overlapping mode. The multiple induction coils are arranged in the main magnetic field transmitting coil. The induction coils do not need to be adjusted, and the self-balance noise reduction metal detection double-coil is high in anti-electromagnetic interference capacity, unlikely to cause false alarms and free of weak induction zones, can normally operate in complex metal environments without being distributed, and is simple in structure, easy to machine and suitable for volume production.

2 Claims, 4 Drawing Sheets

(56) References Cited

U.S. PATENT DOCUMENTS

| | | | | |
|---|---|---|---|---|
| 4,634,975 | A * | 1/1987 | Eccleston | G01V 3/107 324/232 |
| 4,769,900 | A * | 9/1988 | Morinaga | H01F 27/292 29/606 |
| 5,521,583 | A * | 5/1996 | Frahm | G01V 3/105 324/243 |
| 6,268,724 | B1 * | 7/2001 | Crowley | G01V 3/107 324/225 |
| 8,841,903 | B2 * | 9/2014 | Lyon | G01V 3/104 324/239 |
| 2002/0097042 | A1 * | 7/2002 | Kawate | G01B 7/003 324/207.17 |
| 2007/0139040 | A1 * | 6/2007 | Jones | D06F 39/003 324/207.17 |
| 2008/0055080 | A1 * | 3/2008 | Britton | G01V 3/107 340/551 |
| 2012/0049850 | A1 * | 3/2012 | Reime | G01V 3/107 324/329 |
| 2013/0300401 | A1 * | 11/2013 | Krapf | G01V 3/107 324/201 |
| 2014/0340088 | A1 * | 11/2014 | Albrecht | G01V 3/107 324/326 |
| 2015/0168458 | A1 * | 6/2015 | Gannaway | G01V 3/107 324/234 |
| 2017/0176364 | A1 * | 6/2017 | Lyon | G01V 3/105 |

* cited by examiner

SELF-BALANCE NOISE REDUCTION METAL DETECTION DOUBLE-COIL

BACKGROUND OF THE INVENTION

Technical Field

The invention relates to the field of metal detection, in particular to a self-balance noise reduction metal detection double-coil.

Description of Related Art

As is shown in FIG. 1 and FIG. 2, a large coil outside a traditional metal detector is a magnetic field transmitting coil, and small coils in the traditional metal detector are metal induction coils; when a piece of metal approaches the induction coils, the voltage of the induction coil changes, a voltage signal is amplified and sampled, and then an alarm is sent out; the induction coils are likely to be affected by external electromagnetic interference, and a compensating coil is needed for keeping the voltage of the induction coils balanced, so that an existing metal detector is large in workload and poor in anti-electromagnetic interference capacity, and false alarms are caused easily; moreover, as the induction coils are arranged separately, a blank zone, namely a weak induction zone, exists between every two adjacent induction coils, and consequentially, the metal detector cannot operate normally in a complex metal ambient environment.

BRIEF SUMMARY OF THE INVENTION

To solve the problems mentioned in the background art, the invention aims to provide a self-balance noise reduction metal detection double-coil.

The following technical scheme is adopted by the invention for realizing the above aim:

A self-balance noise reduction metal detection double-coil comprises a main magnetic field transmitting coil and a plurality of induction coils. Each induction coil is composed of two identical induction unicoils in series connection, and the two induction unicoils are arranged in parallel. Every two adjacent induction coils are arranged in an overlapping mode. The multiple induction coils are all arranged in the main magnetic field transmitting coil.

As a further scheme of the invention: for the two induction unicoils of each induction coil, the inductance and Q value of one induction unicoil are one to two times those of the other induction unicoil.

Compared with the prior art, the self-balance noise reduction metal detection double-coil has the beneficial effects that the induction coils do not need to be adjusted, and the self-balance noise reduction metal detection double-coil is high in anti-electromagnetic interference capacity, unlikely to cause false alarms and free of weak induction zones, can normally operate in complex metal environments without being distributed, and is simple in structure, easy to machine and suitable for volume production.

DETAILED DESCRIPTION OF THE INVENTION

A clear and complete description of the technical scheme of the embodiments of the invention is given with the drawings in the embodiments as follows, and obviously, the embodiment in the following description is only part of the embodiments of the invention instead of all the embodiments of the invention. Based on the embodiment in the invention, all other embodiments obtained by those ordinarily skilled in the field without creative work are within the protection scope of the invention.

Figure 1:
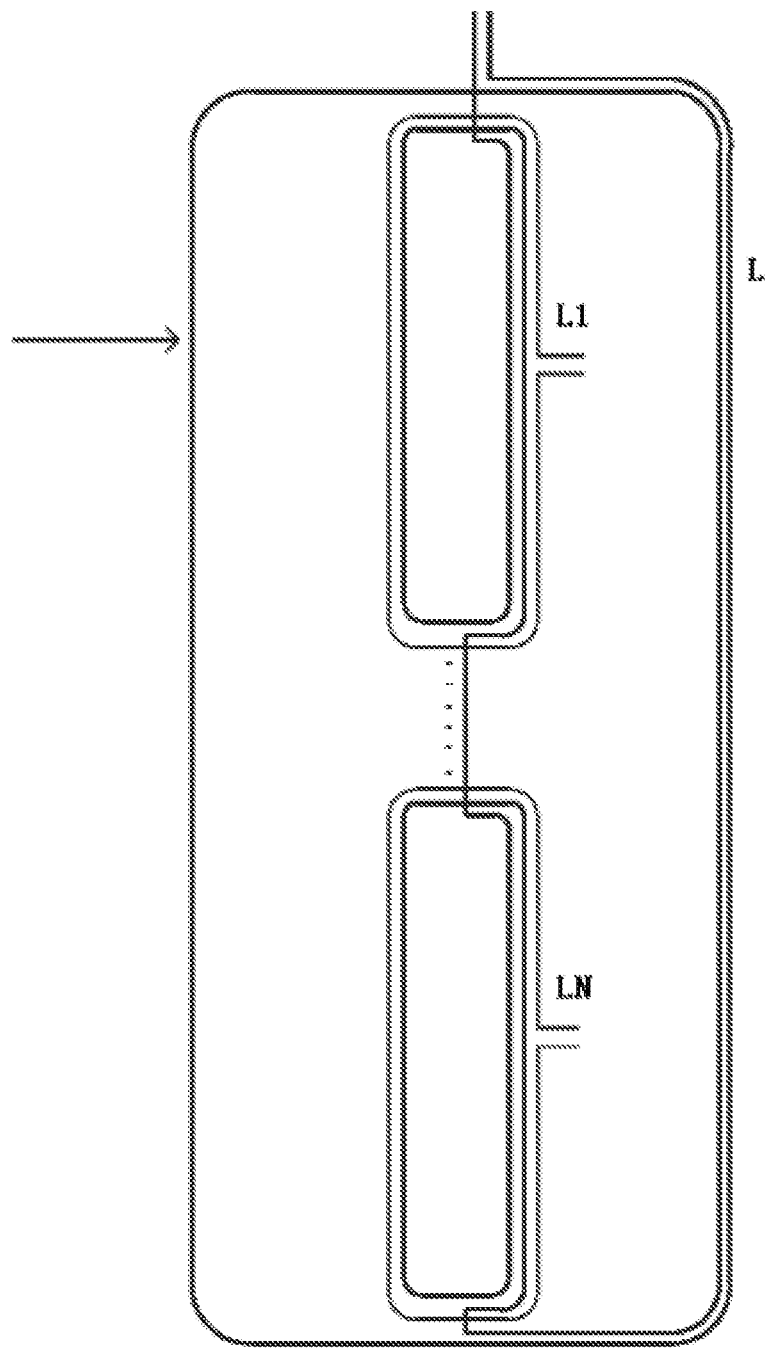
FIG. 1 and FIG. 2 are structural diagrams of a traditional metal detection coil.
Figure 2:
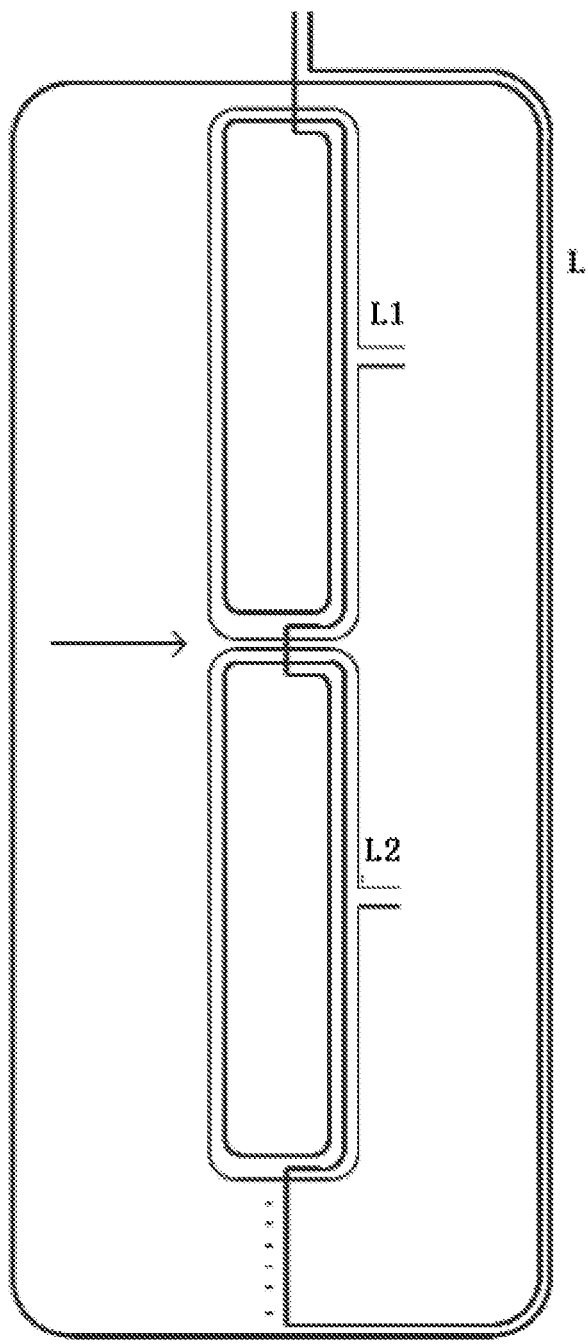
Figure 3:
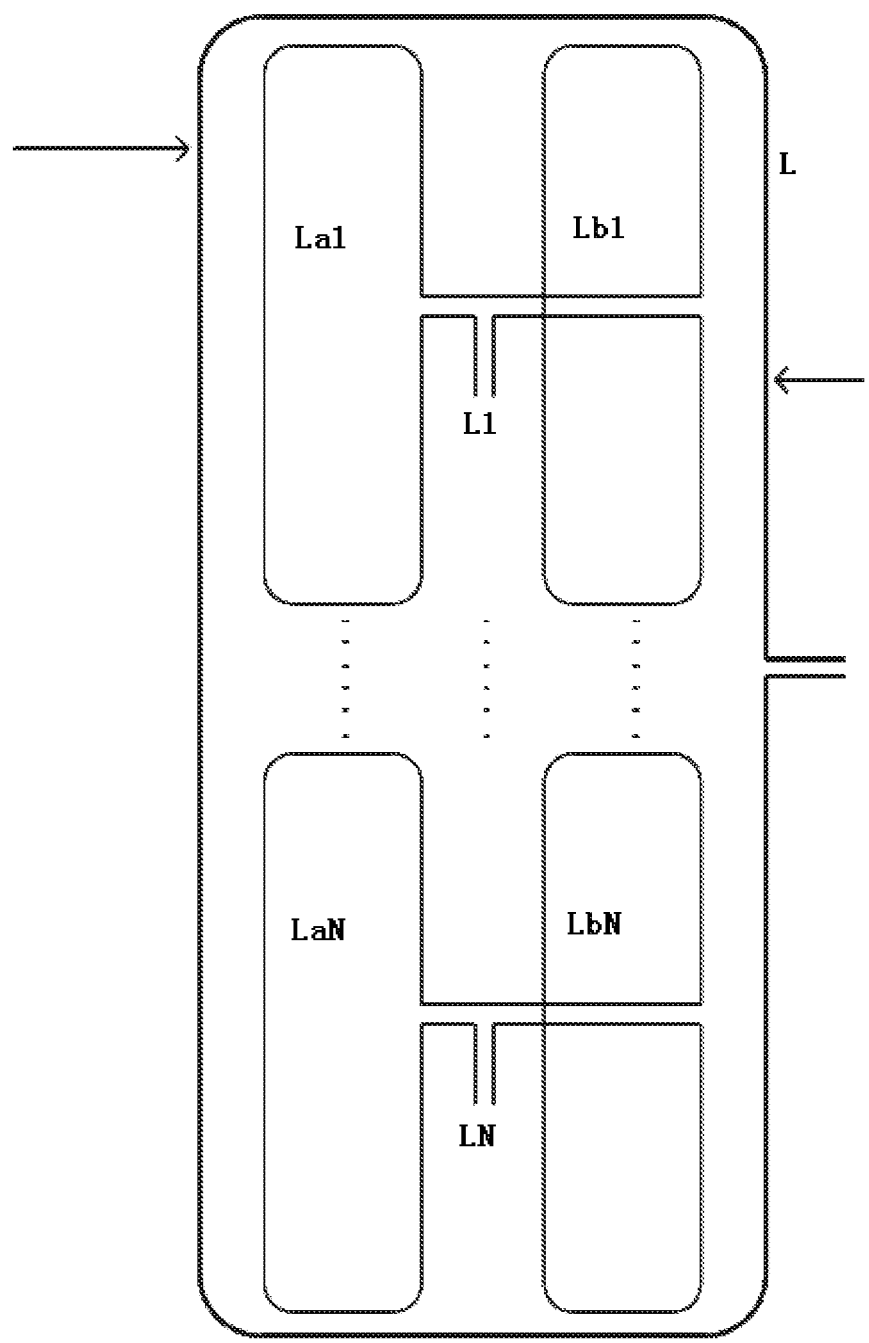
FIG. 3 and FIG. 4 are structural diagrams of the invention.
Figure 4:
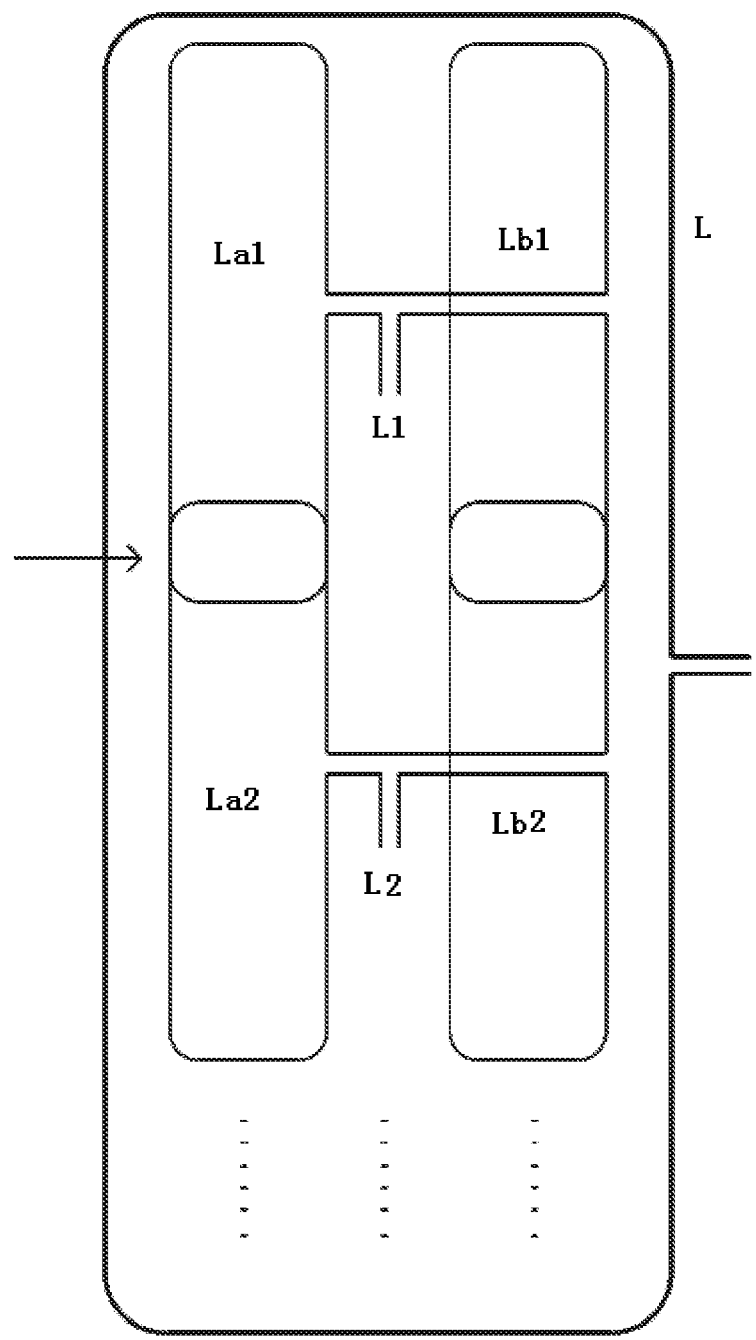

As is shown in FIG. 3 and FIG. 4, a self-balance noise reduction metal detection double-coil comprises a main magnetic field transmitting coil L and a plurality of induction coils L1. Each induction coil L1 is composed of two inductors, an induction unicoil $La1$ and an induction unicoil $Lb1$ which are in series connection, wherein the induction unicoil $La1$ and the induction unicoil $Lb1$ have similar Q values and are arranged in parallel. Every two adjacent induction coils L1 are arranged in an overlapping mode. The multiple induction coils L1 are arranged in the main magnetic field transmitting coil L.

Under the same magnetic field, the voltage obtained by the induction unicoils $La1$ is made different from that obtained by the induction unicoils $Lb1$; in presence of external electromagnetic interference and in a complex metal environment, the voltage obtained by the induction unicoils $La1$ is approximately the same as that obtained by the induction unicoils $Lb1$, and the voltage difference hardly changes obviously; only in the detection process, when metal passes through the induction unicoils $La1$ and then passes through the induction unicoils $Lb1$ or passes through the induction unicoils $Lb1$ first and then passes through the induction unicoils $La1$, the voltage pressure between the induction unicoils $La1$ and the induction unicoils $Lb1$ changes drastically, and the metal can be judged accurately after a voltage signal is amplified and sampled; meanwhile, voltage lines are arranged between the inductors, so that weak induction zones are avoided.

For those skilled in the field, the invention is obviously not limited to the details of the above illustrative embodiment, and the invention can be realized in other specific forms without deviating from the spirit or basic characteristics of the invention. Therefore, in any aspect, the embodiment should be regarded as illustrative and nonrestrictive, the scope of the invention depends on the claims instead of the above description, and all changes within the content and scope of equivalent elements of the claims are within the scope of the invention. Any drawing mark in the claims should not be regarded as a restrictive factor on the claims.

What is claimed is:

1. A self-balance noise reduction metal detection double-coil for detecting presence of a metallic object, comprising:
   a main magnetic field transmitting coil defining a boundary; and
   a plurality of induction coils provided within a boundary of said main magnetic field transmitting coil in such a manner that said induction coils are arranged and distributed in a single column with respect to said main magnetic field transmitting coil, each of said induction coils comprising a first induction unicoil and a second induction unicoil electrically connected in series and arranged and distributed in two columns in an non-overlapping manner with respect to said main magnetic field transmitting coil, wherein a voltage difference between said first unicoil and said second unicoil for each of said induction coils is identical, and when said metallic object pass from said first induction unicoil to said second induction unicoil or vice versa, a voltage difference between said first induction unicoil and said second induction unicoil becomes different so as to indicate the presence of said metallic object.

2. The self-balance noise reduction metal detection double-coil, as recited in claim 1, wherein an inductance of said first induction unicoil is one to two times of that of said corresponding second induction unicoil for each induction coil.

* * * * *